United States Patent
Li et al.

(10) Patent No.: US 10,187,858 B2
(45) Date of Patent: Jan. 22, 2019

(54) SYSTEM FOR BOOSTING A NETWORK SIGNAL, AND THE METHOD THEREOF

(71) Applicant: JRD COMMUNICATION INC., Shenzhen, Guangdong (CN)

(72) Inventors: Cansong Li, Huizhou (CN); Yuanzu Tang, Guangdong (CN); Chuan Chen, Guangdong (CN)

(73) Assignee: JRD COMMUNICATION INC., Shenzhen (CN)

( * ) Notice: Subject to any disclaimer, the term of this patent is extended or adjusted under 35 U.S.C. 154(b) by 0 days.

(21) Appl. No.: 15/555,537

(22) PCT Filed: Nov. 1, 2016

(86) PCT No.: PCT/CN2016/104196
§ 371 (c)(1),
(2) Date: Sep. 4, 2017

(87) PCT Pub. No.: WO2017/152641
PCT Pub. Date: Sep. 14, 2017

(65) Prior Publication Data
US 2018/0110016 A1    Apr. 19, 2018

(30) Foreign Application Priority Data
Mar. 7, 2016    (CN) .......................... 2016 1 0128857

(51) Int. Cl.
*H04W 52/24*    (2009.01)
*H04W 52/28*    (2009.01)
(Continued)

(52) U.S. Cl.
CPC ............ *H04W 52/245* (2013.01); *H04B 1/00* (2013.01); *H04W 52/283* (2013.01); *H04W 52/346* (2013.01)

(58) Field of Classification Search
CPC ... H04W 4/02; H04W 52/0245; H04W 4/025; H04W 52/245
See application file for complete search history.

(56) References Cited

U.S. PATENT DOCUMENTS

2009/0191879 A1* 7/2009 Ichikawa .............. H04W 36/18
455/442
2010/0311415 A1  12/2010 Hamabe et al.
(Continued)

FOREIGN PATENT DOCUMENTS

CN    105323795 A    2/2016

*Primary Examiner* — Keith Ferguson

(57) ABSTRACT

A system of boosting a network signal and a method thereof are provided. The method includes: a mobile terminal obtaining a signal intensity of a base station and comparing the signal intensity to a predetermined first threshold of signal intensity; the mobile terminal sending a request to boost network signals and location information of the mobile terminal to the server, when the signal intensity is less than the first threshold; the base station controller receiving, from the server, the request; the base station controller locating to the base station based on the location information of the mobile terminal; the base station controller determining the number of requests to boost network signals received by the base station; the base station controller comparing the number to a predetermined number threshold; and the base station controller enabling the base station to increase power, when the number is larger than the number threshold.

18 Claims, 4 Drawing Sheets

(51) Int. Cl.
*H04B 1/00* (2006.01)
*H04W 52/34* (2009.01)

(56) References Cited

U.S. PATENT DOCUMENTS

2012/0190352 A1 7/2012 Huang
2014/0112254 A1 4/2014 Lindoff et al.

\* cited by examiner

SYSTEM FOR BOOSTING A NETWORK SIGNAL, AND THE METHOD THEREOF

TECHNICAL FIELD

This disclosure relates generally to the field of mobile terminal technology, and more particularly, to a system for boosting a network signal and the method thereof.

BACKGROUND

In daily life, signal of a mobile terminal may often be attenuated due to an obstruction, such as a building. For example, a cell phone signal may be attenuated by a building. Even the straight line distance between a base station and each of two mobile phones is similar, the respective network signal intensity received by the two mobile phones may vary drastically due to reflection of electromagnetic wave. A location of a base station which is the closest one to a mobile phone may not be obtained and thus the signal intensity of the base station obtained by the cell phone may not be improved using the location information of the mobile phone.

A user may not access internet, make a phone call, and/or have other services using a mobile phone, and user experience may be affected due to mobile phone signal attenuation.

SUMMARY

A principal technical problem to be addressed by the disclosure is to provide a system for boosting a network signal and the method thereof.

According to an aspect of the disclosure, the present disclosure provides a method for boosting a network signal. The method is associated with a system for boosting the network signal, the system comprising a mobile terminal, a server, and a base station controller connected in a sequence, the method comprising: the mobile terminal obtaining a signal intensity of a base station; the mobile terminal comparing the signal intensity to a predetermined first threshold of signal intensity; the mobile terminal sending a request to boost network signals and location information of the mobile terminal to the server, when the signal intensity is less than the predetermined first threshold of signal intensity; the base station controller receiving, from the server, the request to boost network signals and the location information of the mobile terminal; the base station controller locating to the base station based on the location information of the mobile terminal; the base station controller determining the number of requests to boost network signals received by the base station; the base station controller comparing the number to a predetermined number threshold; and the base station controller enabling the base station to increase power, when the number is larger than the number threshold.

In some embodiments, the mobile terminal sending the request to boost network signals and location information of the mobile terminal to the server includes: the server generating an acknowledgment signal based on the request to boost network signals and transmitting the acknowledgment signal to the mobile terminal; and the mobile terminal sending the location information of the mobile terminal to the server after receiving the acknowledgment signal.

In some embodiments, the mobile terminal sending the location information of the mobile terminal to the server after receiving the acknowledgment signal includes: the mobile terminal sending the location information of the mobile terminal and a current operating frequency band of the mobile terminal to the server after receiving the acknowledgment signal; and wherein the base station controller locating to the base station based on the location information of the mobile terminal includes: the base station controller locating to the base station based on the location information of the mobile terminal and the current operating frequency band of the mobile terminal.

In some embodiments, the method for boosting the network signal further comprises: the base station controller sending information of boosting power to the mobile terminal via the server; and the mobile terminal obtaining a current signal intensity, and sending the current signal intensity to the base station controller via the server.

In some embodiments, the base station controller comparing the current signal intensity with a predetermined second threshold of signal intensity; and the base station controller stopping boosting power from the base station and restoring a transmitting power of the base station to an initial value after a predetermined time interval, when the current signal intensity is larger than the second threshold of signal intensity.

In some embodiments, the first threshold of signal intensity is −101 dbm, and the second threshold of signal intensity is −102 dbm.

In some embodiments, the predetermined number threshold is 10.

In some embodiments, the predetermined time interval is 5 minutes.

According to an aspect of the disclosure, the present disclosure provides for a system of boosting a network signal comprising a mobile terminal, a server, and a base station controller connected in a sequence, wherein: the mobile terminal is configured to obtain a signal intensity of a base station; the mobile terminal is configured to compare the signal intensity to a predetermined first threshold of signal intensity; the mobile terminal is configured to send a request to boost network signals and location information of the mobile terminal to the server, when the signal intensity is less than the predetermined first threshold of signal intensity; the base station controller is configured to receive, from the server, the request to boost network signals and the location information of the mobile terminal; the base station controller is configured to locate to the base station based on the location information of the mobile terminal; the base station controller is configured to determine the number of requests to boost network signals received by the base station; the base station controller is configured to compare the number to a predetermined number threshold; and the base station controller is configured to enable the base station to increase power, when the number is larger than the number threshold.

In some embodiments, the server is configured to generate an acknowledgment signal based on the request to boost network signals and transmitting the acknowledgment signal to the mobile terminal; and the mobile terminal is configured to send the location information of the mobile terminal to the server after receiving the acknowledgment signal.

According to an aspect of the disclosure, the present disclosure provides for a system of boosting a network signal comprising a mobile terminal, a server, and a base station controller connected in a sequence, the mobile terminal comprising a first antenna and a baseband chip connected to the first antenna; the server comprising a second antenna, a first processor, and a memory; the first processor connected to the second antenna and the memory respectively; the base station controller comprising a third antenna and a second processor connected to the third antenna; wherein: the baseband chip is configured to obtain a signal intensity of a base station; the baseband chip is configured to compare the signal intensity to a predetermined first threshold of signal intensity; the first antenna is configured to send a request to boost network signals and location information of the mobile terminal to the server, when the signal intensity is less than the first threshold of signal intensity; the first processor is configured to receive, via the second antenna, the request to boost network signals and the location information of the mobile terminal; the first processor is configured to store the request to boost network signals and the location information of the mobile terminal in the memory; the second processor is configured to receive, from the server, the request to boost network signals and the location information of the mobile terminal via the third antenna, and locate to the base station based on the location information of the mobile terminal; the second processor is configured to determine the number of requests to boost network signals received by the base station; the second processor is configured to compare the number to a predetermined number threshold; and the second processor is configured to enable the base station to increase power, when the number is larger than the number threshold.

In some embodiments, the first processor is configured to generate an acknowledgment signal based on the request to boost network signals and transmitting the acknowledgment signal to the mobile terminal; and the baseband chip is configured to send the location information of the mobile terminal to the server after receiving the acknowledgment signal.

In some embodiments, the first antenna is configured to send the location information of the mobile terminal and a current operating frequency band of the mobile terminal to the server after receiving the acknowledgment signal; the second processor is configured to locate to the base station based on the location information of the mobile terminal and the current operating frequency band of the mobile terminal.

In some embodiments, the third antenna is configured to send information of boosting power to the mobile terminal via the server; and the baseband chip is configured to obtain a current signal intensity, and send the current signal intensity to the base station controller via the server.

In some embodiments, the second processor is configured to compare the current signal intensity with a predetermined second threshold of signal intensity; and the second processor is configured to stop boosting power from the base station and restore a transmitting power of the base station to an initial value after a predetermined time interval, when the current signal intensity is larger than the second threshold of signal intensity.

In some embodiments, the first threshold of signal intensity is −101 dbm, and the second threshold of signal intensity is −102 dbm.

In some embodiments, the predetermined number threshold is 10.

In some embodiments, the predetermined time interval is 5 minutes.

Advantages of the disclosed techniques and devices can include the following. Unlike the existing techniques, the present discourse provides for the base station controller receiving, from the server, the request to boost network signals and the location information of the mobile terminal; the base station controller locating to the base station based on the location information of the mobile terminal; the base station controller determining the number of requests to boost network signals received by the base station; the base station controller comparing the number to a predetermined number threshold; and the base station controller enabling the base station to increase power, when the number is larger than the number threshold. The present disclosure may adjust the transmitting power adaptively so as to boost the signal intensity at the mobile terminal, improving signal quality of the mobile terminal and user experience.

BRIEF DESCRIPTION OF THE DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

Figure 1:
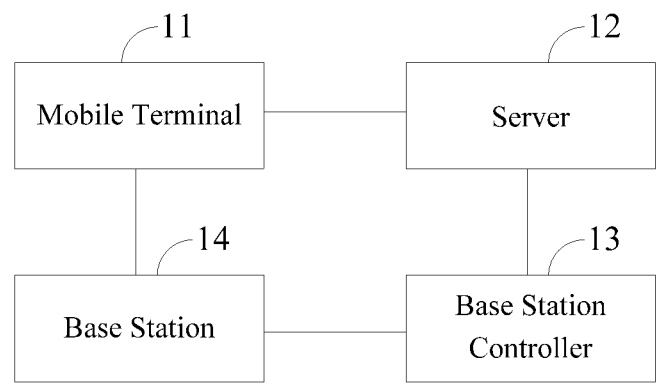
FIG. 1 is a block diagram of a system for boosting a network signal according to an embodiment of the disclosure.
Figure 2:
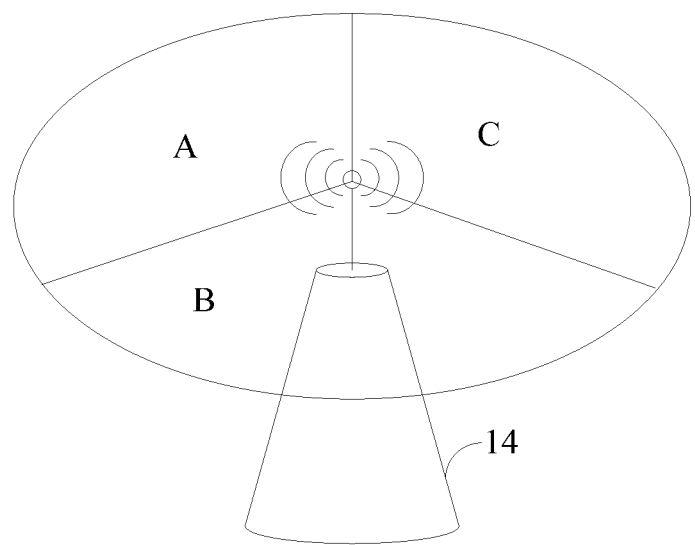
FIG. 2 is a schematic diagram illustrating a signal coverage area of the base station according to the embodiment as illustrated in FIG. 1.

Referring to FIG. 1 and FIG. 2, FIG. 1 is a block diagram of a system for boosting a network signal according to an embodiment of the disclosure. FIG. 2 is a schematic diagram illustrating a signal coverage area of the base station according to the embodiment as illustrated in FIG. 1. As shown in FIG. 1, the system for boosting a network signal of the present disclosure includes a mobile terminal 11, a server 12, a base station controller 13, and a base station 14, where the mobile terminal 11 and the server 12 are connected; the base station controller 13 and the server 12 are connected; the base station controller 13 may be configured to control a plurality of base stations 14. The mobile terminal 11 may be within the signal coverage area of the base station 14. The mobile terminal 11 may establish a connection with the base station 14. The mobile terminal 11 may have a two-way communication with the base station 14 to enable features, such as making voice calls, for the mobile terminal 11. Preferably, the mobile terminal 11 may establish a connection with the server 12 by a WiFi or Bluetooth connection, the base station controller 13 may establish a connection with the server 12 by a wireless connection.

Turning to FIG. 2, the signal coverage area of the base station 14 may include one or more sectors. Preferably, the base station 14 may include three sectors, such as sector A, sector B, and sector C. Each sector may be allocated a different number of carrier frequencies, for example, the allocation between sector A, sector B, and sector C may include a ratio of 4/5/3. That is, sector A may include 4 carrier frequencies, sector B may include 5 carrier frequencies, and sector C may include 3 carrier frequencies, respectively. The carrier frequencies of each sector may be determined by traffic, and the maximum number of carrier frequencies (carrier wave) for each sector may be 12.

In the two-way communication between the mobile terminal 11 and the base station 14, the transmitting signal intensity from the base station 14 may determine the downlink signal intensity; the transmitting signal intensity from the mobile terminal 11 may determine the uplink signal intensity; and the uplink signal intensity may be determined by the downlink signal intensity with a reciprocal relationship. In some embodiments, the transmitting signal intensity from the base station 14 may be related to the transmitting power of the base station 14. The transmitting signal intensity and the transmitting power may be satisfied the following formula:

$$Dbm=10 \log P,$$

where Dbm is the transmitting signal intensity from the base station 14, P is the transmitting power of the base station 14. P may be in the unit of mW. For example, 10 W of the transmitting power of the base station 14 may be converted to 10000 mW, and 10000 mw may be inserted in to the P value in the formula above to obtain the transmitting signal intensity from the base station 14.

The mobile terminal 11 may obtain the signal intensity of the base station 14, and compare the signal intensity with a predetermined first threshold of signal intensity. The mobile terminal 11 may obtain the signal intensity of the base station 14 from get SignalStreghthDbm( ) in PhoneStateIntentReceiver, and compare the signal intensity of the base station 14 with the predetermined first threshold of signal intensity.

When the signal intensity of the base station 14 obtained by the mobile terminal 11 is greater than −105 dbm, the mobile terminal 11 may maintain a good quality of voice calls. Therefore, the predetermined first threshold of signal intensity may be preferably set as −101 dbm.

When the signal intensity is less than the predetermined first threshold of signal intensity, the mobile terminal 11 may send a request to boost network signals to the server 12 and may send location information of the mobile terminal 11 to the server 12. Namely, when the mobile terminal 11 determines that the signal intensity is less than the predetermined first threshold of signal intensity, the mobile terminal 11 may send a request to boost network signals, that is, the mobile terminal 11 may initiate a pingService, create a thread, and send a ping request (e.g., a request to boost network signals) to the server 12, so that the mobile terminal 11 may send a request to boost network signals to the server 12. After sending the request to boost network signals to the server 12 by the mobile terminal 11, the mobile terminal 11 may obtain location information of the mobile terminal 11 and send the location information to the server 12. In some embodiments, the location information of the mobile terminal 11 may include coordinate data.

In other embodiments of the present disclosure, the mobile terminal 11 may further obtain RSSI (Received Signal Strength Indication) and the operating frequency band of the mobile terminal 11 and send the RSSI data and the operating frequency band information to the server 12.

When the mobile terminal 11 determines that the signal intensity is larger than or equal to the predetermined first threshold of signal intensity, the mobile terminal 11 may obtain the signal intensity of the base station 14, and compare the signal intensity with the predetermined first threshold of signal intensity.

The base station controller 13 may receive, from the server 12, the request to boost network signals and the location information of the mobile terminal 11, and locate to the base station 14 based on the location information of the mobile terminal 11. In some embodiments, the base station controller 13 may search for the base station 14 associated with the mobile terminal 11 based on the location information of the mobile terminal 11, when the base station controller 13 receives the request to boost network signals and the location information of the mobile terminal 11. That is, the base station controller 13 may search for the base station 14 which is closest to the mobile terminal 11, based on the location information of the mobile terminal 11.

The base station controller 13 may determine the number of requests to boost network signals received by the base station 14; and compare the number to a predetermined number threshold. In some embodiments, the base station controller 13 may count the number of requests to boost network signals received by the base station 14. That is, the base station controller 13 may count multiple requests to boost network signals received by the base station 14. Preferably, the multiple requests to boost network signals may be made from different mobile terminals 11. Preferably, the predetermined number threshold may be 10.

When the number is larger than the number threshold, the base station controller 13 may enable the base station 14 to increase power. In some embodiments, when the base station controller 13 determines that the number of requests to boost network signals received by the base station 14 is larger than the number threshold, the base station controller 13 may enable the base station 14 to increase power. That is, the base station controller 13 may initiate a predetermined power boosting mechanism. The base station 14 may initiate a power boosting mechanism to boost the transmitting power of the base station 14, so as to boost the signal intensity of the base station 14. Thus, the signal intensity received by the mobile terminal 11 may be increased, so as to improve the signal quality of the mobile terminal 11 and user experience.

When the base station controller 13 determines that the number of requests to boost network signals received by the base station 14 is less than or equal to the number threshold, then the step may return to the step that the base station controller 13 may determine the number of requests to boost network signals received by the base station 14; and compare the number to a predetermined number threshold.

The present disclosure provides for a system for boosting a network signal according to a second embodiment of the disclosure, which may be described based on the system for boosting a network signal of the first embodiment of the disclosure. In some embodiments, the server 12 may generate an acknowledgment signal, and may send the acknowledgment signal to the mobile terminal 11, after receiving the request to boost network signals from the mobile terminal 11. The mobile terminal 11 may send the location information of the mobile terminal 11 to server 12, after receiving the acknowledgment signal.

In other embodiments of the present disclosure, the mobile terminal 11 may send the location information and the operating frequency band of mobile terminal 11 to the server 12 after receiving the acknowledgment signal. The base station controller 13 may locate to the base station 14 based on the location information and the operating frequency band of the mobile terminal 11. That is, when there are multiple base stations 14 with difference frequency bands located close to the mobile terminal 11, the mobile terminal 11 may further locate to the base station 14 based on the operating frequency band of the mobile terminal 11, so as to improve the locating accuracy of the base station controller 13.

The base station controller 13 may send information of increasing power to the mobile terminal 11 via the server 12. In some embodiments, information of increasing power may include a request for sending the signal intensity by mobile terminal 11. The base station controller 13 may send the request for sending the signal intensity by mobile terminal 11 to the mobile terminal 11 via the server 12.

The mobile terminal 11 may obtain the current signal intensity, and may send the current signal intensity to the base station controller 13 via the server 12. In some embodiments, after receiving information of increasing power, the mobile terminal 11 may obtain the current signal intensity in real time and send the current signal intensity to the base station controller 13 via the server 12, based on the request for sending the signal intensity by mobile terminal 11.

The base station controller 13 may compare the current signal intensity with a predetermined second threshold of signal intensity. When the current signal intensity is greater than the predetermined second threshold of signal intensity, the base station controller 13 may stop increasing power from the base station 14 and restore the transmitting power of the base station 14 to an initial value after a predetermined time interval. That is, when the base station controller 13 determines that the current signal intensity is greater than the predetermined second threshold of signal intensity, the base station controller 13 may stop increasing power from the base station 14. That is, the base station 14 may stop a predetermined power increasing mechanism and stop increasing the transmitting power. The base station controller 13 may restore the transmitting power of the base station 14 to an initial value after a predetermined time interval, that is, the base station controller 13 may send a message, after a predetermined time interval, informing the base station 14 to restore the transmitting power to an initial value. Preferably, the predetermined time interval may be set as 5 minutes.

When the base station controller 13 determines that the current signal intensity is less than or equal to the predetermined second threshold of signal intensity, the base station controller 13 may return to the step of comparing the current signal intensity with the predetermined second threshold of signal intensity. Preferably, the predetermined second threshold of signal intensity may be set as −102 dbm.

Compared with the system for boosting a network signal of the first embodiment of the disclosure, in the present embodiment, the base station controller 13 may control the base station 14 to restore the transmitting power to an initial value in a predetermined time interval, to make sure the output power of the base station 14 not interfering with other base stations or signals in the area, so as to better solve the problem of poor signal quality of the mobile terminal 11.

Figure 3:
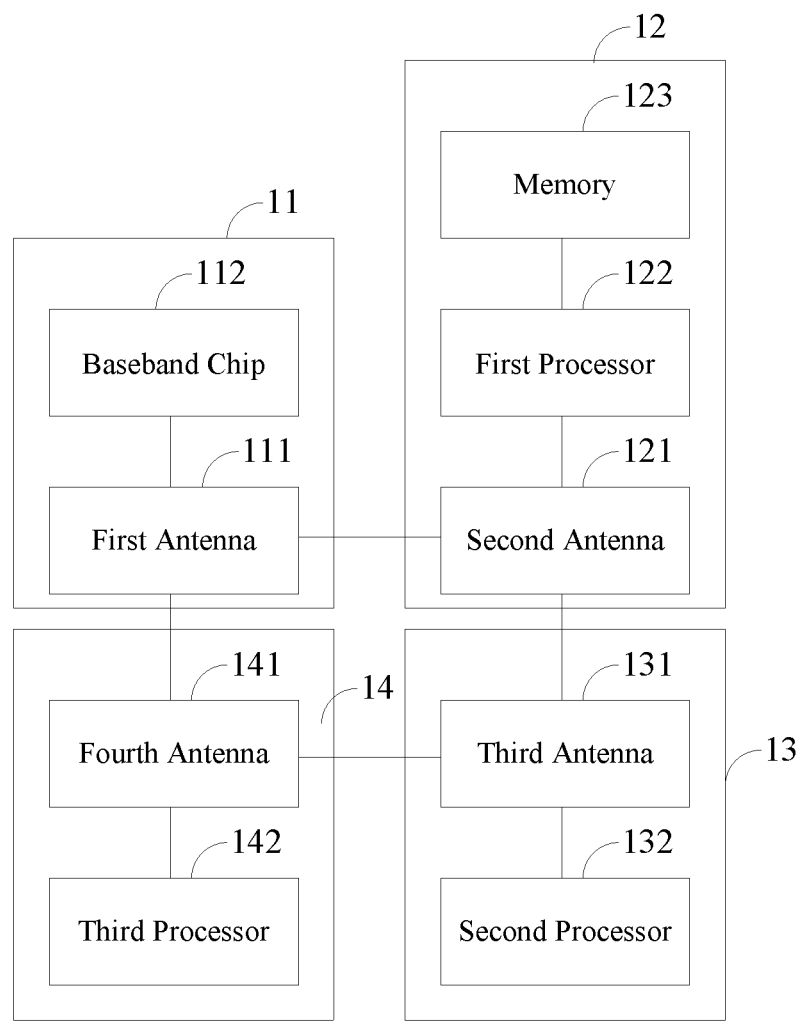
FIG. 3 is a block diagram of a system for boosting a network signal according to yet another embodiment of the disclosure.

The present disclosure provides for a system for boosting a network signal according to a third embodiment of the disclosure, which may be described based on the system for boosting a network signal of the first embodiment of the disclosure. As shown in FIG. 3, a mobile terminal 11 includes a first antenna 111 and a baseband chip 112 connected to the first antenna 111; a server 12 including a second antenna 121, a first processor 122, and a memory 123 where the first processor 122 is connected to the second antenna 121 and the memory 123 respectively; a base station controller 13 including a third antenna 131 and a second processor 132 connected to the third antenna 131; and a base station 14 including a fourth antenna 141 and a third processor 143 connected to the fourth antenna 141.

In some embodiments, the first antenna 111 and the third antenna 131 may connect to the second antenna 121 respectively in order to establish a connection between the mobile terminal 11 and the server 12, and a connection between the base station controller 13 and the server 12. The fourth antenna 141 may connect with the third antenna 131 to enable the base station controller 13 to control base station 14. The first antenna 111 may connect with the fourth antenna 141 to enable a two-way communication between the mobile terminal 11 and the base station 14.

The baseband chip 112 may obtain the signal intensity of the base station 14, and compare the signal intensity with the predetermined first threshold of signal intensity. The baseband chip 112 may obtain the signal intensity of the base station 14 from get SignalStreghthDbm( ) in PhoneStateIntentReceiver, and may compare the signal intensity of the base station 14 with the predetermined first threshold of signal intensity.

When the signal intensity is less than the first threshold of signal intensity, the baseband chip 112 may send a request to boost network signals to the server 12 via the first antenna 111 and may send location information of the mobile terminal 11 to the server 12 via the first antenna 111.

The first processor 122 may be configured to receive, from the server 12, the request to boost network signals and the location information of the mobile terminal 11 via the second antenna 121, and store the request to boost network signals and the location information of the mobile terminal 11 in the memory 123.

The second processor 132 may be configured to receive, from the server 12, the request to boost network signals and the location information of the mobile terminal 11 via the third antenna 131, and locate to the base station 14 based on the location information of the mobile terminal 11.

The second processor 132 may determine the number of requests to boost network signals received by the base station 14; and compare the number to a predetermined number threshold. When the second processor 132 determines the number is larger than the number threshold, the second processor 132 may enable the base station 14 to increase power via the third antenna 131.

The third processor 142 may be configured to receive one or more instructions to increase the power via the fourth antenna 141. That is, the third processor 142 may initiate a predetermined power boosting mechanism to boost the transmitting power of the fourth antenna 141, so as to boost the signal intensity of the base station 14. Thus, the signal intensity received by the mobile terminal 11 may be increased, so as to improve the signal quality of the mobile terminal 11 and user experience.

Figure 4:
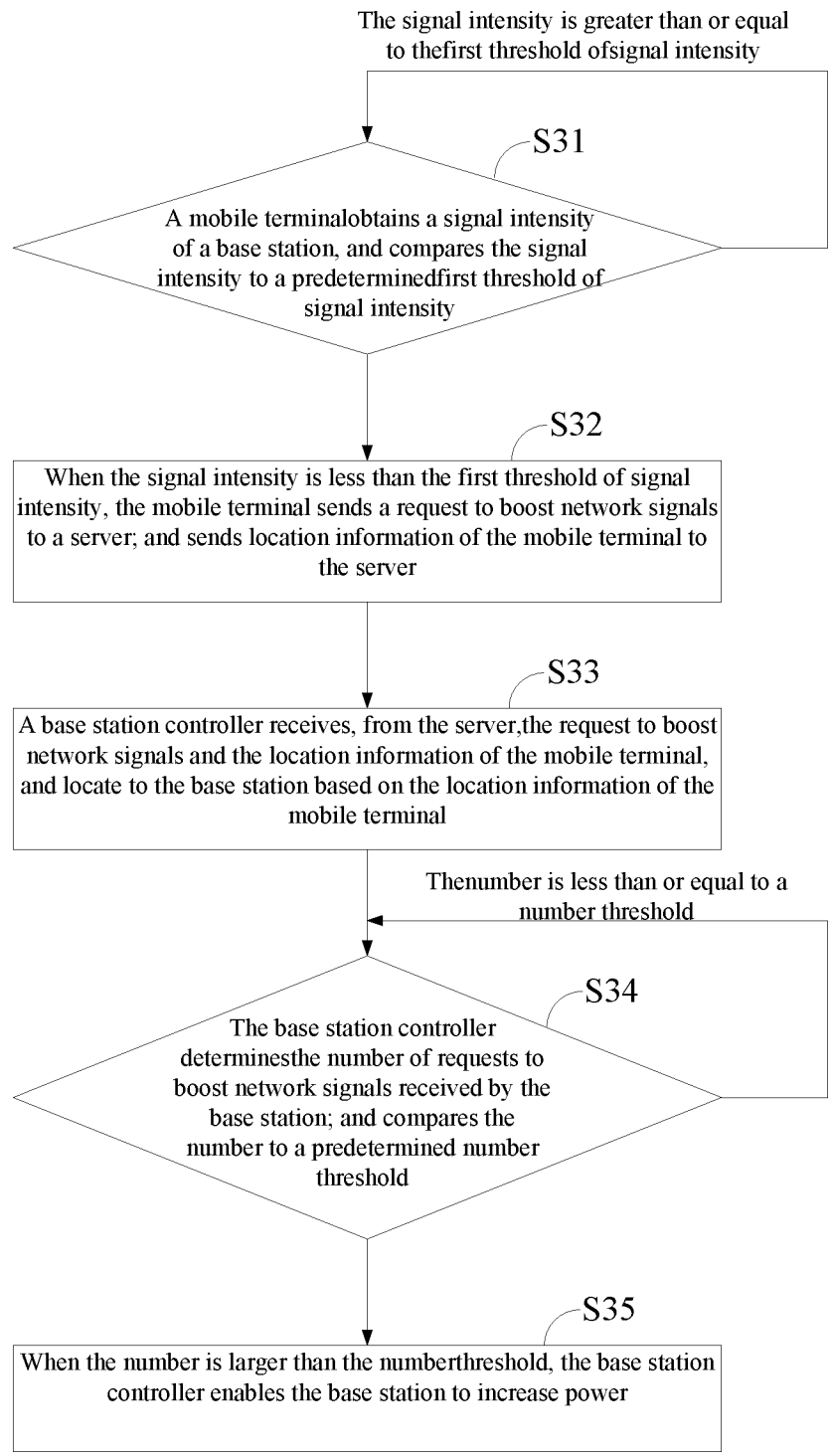
FIG. 4 is a flow diagram of a method for boosting a network signal according to an embodiment of the disclosure.

The present disclosure provides a method for boosting a network signal according to the first embodiment of the disclosure, the method for boosting a network signal disclosed in the present embodiment may be applied to the system for boosting a network signal as described above. As shown in FIG. 4, the method for boosting a network signal includes:

Block S31: the mobile terminal 11 obtains a signal intensity of the base station 14, and compares the signal intensity to a predetermined first threshold of signal intensity.

In some embodiments, the mobile terminal 11 may be located within signal coverage area of the base station 14. The mobile terminal 11 may obtain the signal intensity of the base station 14 from get SignalStreghthDbm( ) in PhoneStateIntentReceiver, and compare the signal intensity of the base station 14 with the predetermined first threshold of signal intensity.

When the signal intensity of the base station 14 obtained by the mobile terminal 11 is greater than −105 dbm, the mobile terminal 11 may maintain a good quality of voice calls. Therefore, the predetermined first threshold of signal intensity may be preferably set as −101 dbm.

Block S32: when the signal intensity is less than the predetermined first threshold of signal intensity, the mobile terminal 11 sends a request to boost network signals to the server 12 and sends location information of the mobile terminal 11 to the server 12. In some embodiments, when the mobile terminal 11 determines that the signal intensity is less than the predetermined first threshold of signal intensity, the mobile terminal 11 may send a request to boost network signals, that is, the mobile terminal 11 may initiate a pingService, create a thread, and send a ping request (e.g., a request to boost network signals) to the server 12, so that the mobile terminal 11 may send a request to boost network signals to the server 12.

After sending the request to boost network signals to the server 12 by the mobile terminal 11, the mobile terminal 11 may obtain location information of the mobile terminal 11 and send the location information to the server 12. In some embodiments, the location information of the mobile terminal 11 may include coordinate data.

In other embodiments of the present disclosure, the mobile terminal 11 may further obtain RSSI (Received Signal Strength Indication) and the operating frequency band of the mobile terminal 11 and send the RSSI data and the operating frequency band information to the server 12.

When the mobile terminal 11 determines that the signal intensity is larger than or equal to the predetermined first threshold of signal intensity, the block proceeds to return to block S31.

Block S33: the base station controller 13 receives, from the server 12, the request to boost network signals and the location information of the mobile terminal 11, and locate to the base station 14 based on the location information of the mobile terminal 11.

In some embodiments, the base station controller 13 may search for the base station 14 associated with the mobile terminal 11 based on the location information of the mobile terminal 11, when the base station controller 13 receives the request to boost network signals and the location information of the mobile terminal 11. That is, the base station controller 13 may search for the base station 14 which is closest to the mobile terminal 11, based on the location information of the mobile terminal 11.

Block S34: the base station controller 13 determines the number of requests to boost network signals received by the base station 14; and compares the number to a predetermined number threshold. In some embodiments, the base station controller 13 may count the number of requests to boost network signals received by the base station 14. That is, the base station controller 13 may count multiple requests to boost network signals received by the base station 14. Preferably, the multiple requests to boost network signals may be made from different mobile terminals 11.

Preferably, the predetermined number threshold may be 10.

Block S35: when the number is larger than the number threshold, the base station controller 13 enables the base station 14 to increase power.

In some embodiments, when the base station controller 13 determines that the number of requests to boost network signals received by the base station 14 is larger than the number threshold, the base station controller 13 may enable the base station 14 to increase power. That is, the base station controller 13 may initiate a predetermined power boosting mechanism. The base station 14 may initiate a power boosting mechanism to boost the transmitting power of the base station 14, so as to boost the signal intensity of the base station 14. Thus, the signal intensity received by the mobile terminal 11 may be increased, so as to improve the signal quality of the mobile terminal 11 and user experience.

When the base station controller 13 determines that the number of requests to boost network signals received by the base station 14 is less than or equal to the number threshold, then the step may return to block S34.

The present disclosure provides for a method for boosting a network signal according to a second embodiment of the disclosure, which may be described based on the method for boosting a network signal of the first embodiment of the disclosure.

Figure 5:
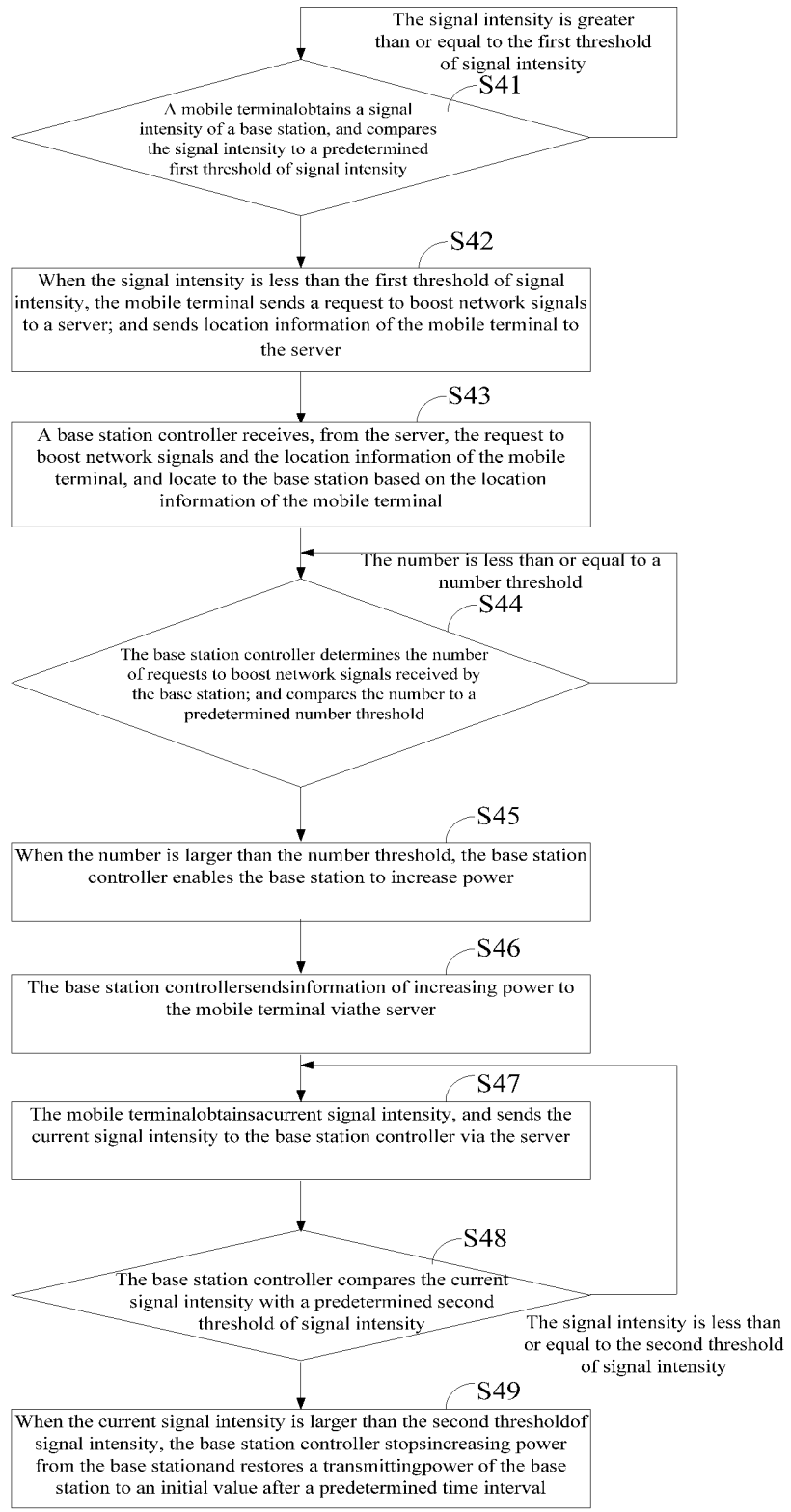
FIG. 5 is a flow diagram of a method for boosting a network signal according to another embodiment of the disclosure.

As shown in FIG. 5, the method for boosting a network signal includes following steps:

Blocks S41-S45 are the same as blocks 31-35 described above, and description thereof is not repeated here.

Block S46: the base station controller 13 sends information of increasing power to the mobile terminal 11 via the server 12.

Block S47: the mobile terminal 11 obtains a current signal intensity, and sends the current signal intensity to the base station controller 13 via the server 12.

Block S48: the base station controller 13 compares the current signal intensity with a predetermined second threshold of signal intensity.

Block S49: when the current signal intensity is larger than the second threshold of signal intensity, the base station controller 13 stops increasing power from the base station 14 and restores a transmitting power of the base station 14 to an initial value after a predetermined time interval.

At block S42, the server 12 may generate an acknowledgment signal, and may send the acknowledgment signal to the mobile terminal 11, after receiving the request to boost network signals from the mobile terminal 11. The mobile terminal 11 may send the location information of the mobile terminal 11 to server 12, after receiving the acknowledgment signal.

In other embodiments of the present disclosure, the mobile terminal 11 may send the location information and the operating frequency band of mobile terminal 11 to the server 12 after receiving the acknowledgment signal. The base station controller 13 may locate to the base station 14 based on the location information and the operating frequency band of the mobile terminal 11. That is, when there are multiple base stations 14 with difference frequency bands located close to the mobile terminal 11, the mobile terminal 11 may further locate to the base station 14 based on the operating frequency band of the mobile terminal 11, so as to improve the locating accuracy of the base station controller 13.

At block S46, information of increasing power may include a request for sending the signal intensity by mobile terminal 11. The base station controller 13 may send the request for sending the signal intensity by mobile terminal 11 to the mobile terminal 11 via the server 12.

At block S47, after receiving the information of increasing power, the mobile terminal 11 may obtain the current signal intensity, and may send the current signal intensity to the base station controller 13 via the server 12, based on the request for sending the signal intensity by mobile terminal 11.

At block S48, the predetermined second threshold of signal intensity may be set as −102 dbm.

At block S49, when the base station controller 13 determines that the current signal intensity is greater than the predetermined second threshold of signal intensity, the base station controller 13 may stop increasing power from the base station 14. That is, the base station 14 may stop a predetermined power increasing mechanism and stop increasing the transmitting power. The base station controller 13 may restore the transmitting power of the base station 14 to an initial value after a predetermined time interval, that is, the base station controller 13 may send a message, after a predetermined time interval, informing the base station 14 to restore the transmitting power to an initial value. Preferably, the predetermined time interval may be set as 5 minutes.

When the base station controller 13 determines that the current signal intensity is smaller than or equal to the predetermined second threshold of signal intensity, then the step returns to the block S47.

Compared with the method for boosting a network signal of the first embodiment of the disclosure, in the present embodiment, the base station controller 13 may control the base station 14 to restore the transmitting power to an initial value in a predetermined time interval, to make sure the output power of the base station 14 not interfering with other base stations or signals in the area, so as to better solve the problem of poor signal quality of the mobile terminal 11.

In the present disclosure, the mobile terminal 11, preferably, may include a smart phone, a tablet or other mobile terminals.

As described above, the present disclosure provides that the base station controller 13 may receive, from the server 12, the request to boost network signals and the location information of the mobile terminal 11, and locate to the base station 14 based on the location information of the mobile terminal 11. The base station controller 13 may determine the number of requests to boost network signals received by the base station 14; and compare the number to a predetermined number threshold. When the number is larger than the number threshold, the base station controller 13 may enable the base station 14 to increase power. The base station 14 may adjust the transmitting power of the base station 14 adaptively, to boost the signal intensity received by the mobile terminal 11, so as to improve the signal quality of the mobile terminal 11 and user experience. In addition, the base station controller 13 may control the base station 14 to restore the transmitting power to an initial value in a predetermined time interval, to make sure the output power of the base station 14 not interfering with other base stations or signals in the area, so as to better solve the problem of poor signal quality of the mobile terminal 11.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A method for boosting a network signal, wherein the method is associated with a system for boosting the network signal, the system comprising a mobile terminal, a server, and a base station controller connected in a sequence, the method comprising:
    the mobile terminal obtaining a signal intensity of a base station;
    the mobile terminal comparing the signal intensity to a predetermined first threshold of signal intensity;
    the mobile terminal sending a request to boost network signals and location information of the mobile terminal to the server, when the signal intensity is less than the predetermined first threshold of signal intensity;
    the base station controller receiving, from the server, the request to boost network signals and the location information of the mobile terminal;
    the base station controller locating to the base station based on the location information of the mobile terminal;
    the base station controller determining the number of requests to boost network signals received by the base station;
    the base station controller comparing the number of requests to a predetermined number threshold; and
    the base station controller enabling the base station to increase power, when the number of requests is larger than the number threshold.

2. The method for boosting the network signal according to claim 1, wherein the mobile terminal sending the request to boost network signals and location information of the mobile terminal to the server comprises:
    the server generating an acknowledgment signal based on the request to boost network signals and transmitting the acknowledgment signal to the mobile terminal; and
    the mobile terminal sending the location information of the mobile terminal to the server after receiving the acknowledgment signal.

3. The method for boosting the network signal according to claim 2, wherein the mobile terminal sending the location information of the mobile terminal to the server after receiving the acknowledgment signal comprises:
    the mobile terminal sending the location information of the mobile terminal and a current operating frequency band of the mobile terminal to the server after receiving the acknowledgment signal; and wherein the base station controller locating to the base station based on the location information of the mobile terminal comprises:
    the base station controller locating to the base station based on the location information of the mobile terminal and the current operating frequency band of the mobile terminal.

4. The method for boosting the network signal according to claim 2, further comprising:
    the base station controller sending information of boosting power to the mobile terminal via the server; and
    the mobile terminal obtaining a current signal intensity, and sending the current signal intensity to the base station controller via the server.

5. The method for boosting the network signal according to claim 4, further comprising:
    the base station controller comparing the current signal intensity with a predetermined second threshold of signal intensity; and
    the base station controller stopping boosting power from the base station and restoring a transmitting power of the base station to an initial value after a predetermined time interval, when the current signal intensity is larger than the predetermined second threshold of signal intensity.

6. The method for boosting the network signal according to claim 5, wherein the predetermined first threshold of signal intensity is −101 dbm, and the predetermined second threshold of signal intensity is −102 dbm.

7. The method for boosting the network signal according to claim 5, wherein the predetermined number threshold is 10.

8. The method for boosting the network signal according to claim 5, wherein the predetermined time interval is 5 minutes.

9. A system of boosting a network signal comprising a mobile terminal, a server, and a base station controller connected in a sequence, wherein:
the mobile terminal is configured to obtain a signal intensity of a base station;
the mobile terminal is configured to compare the signal intensity to a predetermined first threshold of signal intensity;
the mobile terminal is configured to send a request to boost network signals and location information of the mobile terminal to the server, when the signal intensity is less than the predetermined first threshold of signal intensity;
the base station controller is configured to receive, from the server, the request to boost network signals and the location information of the mobile terminal;
the base station controller is configured to locate to the base station based on the location information of the mobile terminal;
the base station controller is configured to determine the number of requests to boost network signals received by the base station;
the base station controller is configured to compare the number of requests to a predetermined number threshold; and
the base station controller is configured to enable the base station to increase power, when the number of requests is larger than the number threshold.

10. The system of boosting the network signal according to claim 9, wherein:
the server is configured to generate an acknowledgment signal based on the request to boost network signals and transmitting the acknowledgment signal to the mobile terminal; and
the mobile terminal is configured to send the location information of the mobile terminal to the server after receiving the acknowledgment signal.

11. A system of boosting a network signal, the system comprising a mobile terminal, a server, and a base station controller connected in a sequence, the mobile terminal comprising a first antenna and a baseband chip connected to the first antenna; the server comprising a second antenna, a first processor, and a memory; the first processor connected to the second antenna and the memory respectively; the base station controller comprising a third antenna and a second processor connected to the third antenna; wherein:
the baseband chip is configured to obtain a signal intensity of a base station;
the baseband chip is configured to compare the signal intensity to a predetermined first threshold of signal intensity;
the first antenna is configured to send a request to boost network signals and location information of the mobile terminal to the server, when the signal intensity is less than the predetermined first threshold of signal intensity;
the first processor is configured to receive, via the second antenna, the request to boost network signals and the location information of the mobile terminal;
the first processor is configured to store the request to boost network signals and the location information of the mobile terminal in the memory;
the second processor is configured to receive, from the server, the request to boost network signals and the location information of the mobile terminal via the third antenna, and locate to the base station based on the location information of the mobile terminal;
the second processor is configured to determine the number of requests to boost network signals received by the base station;
the second processor is configured to compare the number of requests to a predetermined number threshold; and
the second processor is configured to enable the base station to increase power, when the number of requests is larger than the number threshold.

12. The system of boosting the network signal according to claim 11, wherein:
the first processor is configured to generate an acknowledgment signal based on the request to boost network signals and transmitting the acknowledgment signal to the mobile terminal; and
the baseband chip is configured to send the location information of the mobile terminal to the server after receiving the acknowledgment signal.

13. The system of boosting the network signal according to claim 12, wherein:
the first antenna is configured to send the location information of the mobile terminal and a current operating frequency band of the mobile terminal to the server after receiving the acknowledgment signal;
the second processor is configured to locate to the base station based on the location information of the mobile terminal and the current operating frequency band of the mobile terminal.

14. The system of boosting the network signal according to claim 12, wherein:
the third antenna is configured to send information of boosting power to the mobile terminal via the server; and
the baseband chip is configured to obtain a current signal intensity, and send the current signal intensity to the base station controller via the server.

15. The system of boosting the network signal according to claim 14, wherein:
the second processor is configured to compare the current signal intensity with a predetermined second threshold of signal intensity; and
the second processor is configured to stop boosting power from the base station and restore a transmitting power of the base station to an initial value after a predetermined time interval, when the current signal intensity is larger than the predetermined second threshold of signal intensity.

16. The system of boosting the network signal according to claim 15, wherein the predetermined first threshold of signal intensity is −101 dbm, and the predetermined second threshold of signal intensity is −102 dbm.

17. The system of boosting the network signal according to claim 15, wherein the predetermined number threshold is 10.

18. The system of boosting the network signal according to claim 15, wherein the predetermined time interval is 5 minutes.

\* \* \* \* \*